(12) United States Patent
Sridhara et al.

(10) Patent No.: US 9,607,146 B2
(45) Date of Patent: Mar. 28, 2017

(54) DATA FLOW BASED BEHAVIORAL ANALYSIS ON MOBILE DEVICES

(71) Applicant: QUALCOMM Incorporated, San Diego, CA (US)

(72) Inventors: Vinay Sridhara, Santa Clara, CA (US); Sudha Anil Kumar Gathala, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 14/030,053

(22) Filed: Sep. 18, 2013

(65) Prior Publication Data
US 2015/0082430 A1    Mar. 19, 2015

(51) Int. Cl.
G06F 21/00    (2013.01)
G06F 21/55    (2013.01)
G06F 21/56    (2013.01)

(52) U.S. Cl.
CPC .......... G06F 21/552 (2013.01); G06F 21/566 (2013.01)

(58) Field of Classification Search
CPC ............. H04L 63/1408; H04L 63/1458; H04L 63/1416; H04L 63/1441; G06F 21/552; G06F 21/566
See application file for complete search history.

(56) References Cited

U.S. PATENT DOCUMENTS

| 7,694,150 B1 * | 4/2010 | Kirby ............................ 713/188 |
| 8,555,385 B1 * | 10/2013 | Bhatkar et al. ................. 726/22 |
| 2005/0187740 A1 * | 8/2005 | Marinescu ........................ 703/1 |
| 2008/0016339 A1 | 1/2008 | Shukla |
| 2009/0019546 A1 * | 1/2009 | Park ........................ G06F 21/57 726/24 |
| 2009/0199296 A1 | 8/2009 | Xie et al. |
| 2010/0313270 A1 * | 12/2010 | Kim .......................... G06F 1/28 726/24 |
| 2011/0047620 A1 * | 2/2011 | Mahaffey et al. .............. 726/23 |
| 2012/0210423 A1 | 8/2012 | Friedrichs et al. |
| 2012/0222120 A1 | 8/2012 | Rim et al. |

(Continued)

FOREIGN PATENT DOCUMENTS

WO     02103498 A2    12/2002

OTHER PUBLICATIONS

Fritz C., et al., "Highly Precise Taint Analysis for Android Applications," Technical Report, Nr. TUD-CS-2013-0113, May 8, 2013, 14 pages.

(Continued)

*Primary Examiner* — Chau Le
*Assistant Examiner* — Ghodrat Jamshidi
(74) *Attorney, Agent, or Firm* — The Marbury Law Group, PLLC

(57) ABSTRACT

Methods, devices and systems for detecting suspicious or performance-degrading mobile device behaviors intelligently, dynamically, and/or adaptively determine computing device behaviors that are to be observed, the number of behaviors that are to be observed, and the level of detail or granularity at which the mobile device behaviors are to be observed. The various aspects efficiently identify suspicious or performance-degrading mobile device behaviors without requiring an excessive amount of processing, memory, or energy resources.

28 Claims, 12 Drawing Sheets

(56) References Cited

U.S. PATENT DOCUMENTS

2013/0031599 A1    1/2013  Luna et al.
2013/0097706 A1    4/2013  Titonis et al.
2013/0111547 A1    5/2013  Kraemer
2013/0312099 A1*  11/2013  Edwards ............... G06F 21/554
                                                                                726/24

OTHER PUBLICATIONS

Dai S., et al., "DroidLogger: Reveal suspicious behavior of Android applications via instrumentation", Computing and Convergence Technology (ICCCT), 2012 7th International Conference on, IEEE, Dec. 3, 2012 (Dec. 3, 2012), pp. 550-555, XP032422088, ISBN: 978-1-4673-0894-6.
International Search Report and Written Opinion—PCT/US2014/055931—ISA/EPO—Mar. 11, 2015.
Yin H., et al., "Panorama", Proceedings of the 14th ACM Conference on Computer and Communications Security, CCS '07, Jan. 1, 2007 (Jan. 1, 2007), p. 116, XP055158286, New York, New York, USA, DOI: 10.1145/1315245.1315261, ISBN: 978-1-59-593703-2.

* cited by examiner

DATA FLOW BASED BEHAVIORAL ANALYSIS ON MOBILE DEVICES

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of analyzing mobile device behaviors to identify a malicious software application by identifying a critical data resource that requires close monitoring, identifying an intermediate resource associated with the critical data resource, monitoring API calls made by a software application when accessing the critical data resource and the intermediate resource, identifying mobile device resources that are consumed or produced by the API calls, identifying a pattern of API calls as being indicative of malicious activity by the software application, generating a light-weight behavior signature based on the identified pattern of API calls and the identified mobile device resources, using the light-weight behavior signature to perform behavior analysis operations, and determining whether the software application is malicious or benign based on the behavior analysis operations.

In an aspect, identifying the mobile device resources that are consumed or produced by the API calls may include identifying ghost resources produced by the API calls. In a further aspect, identifying the intermediate resource associated with the critical data resource may include identifying a resource that requires API call monitoring based on API calls made by the software application to the critical data resource. In a further aspect, the method may include observing mobile device behaviors over a period of time to recognize mobile device behaviors that are inconsistent with normal operation patterns, in which using the light-weight behavior signature to perform behavior analysis operations may include dynamically determining the mobile device behaviors that are to be observed based on information included in the light-weight behavior signature. In a further aspect, using the light-weight behavior signature to perform behavior analysis operations may include identifying mobile device behaviors that require deeper analysis based on information included in the light-weight behavior signature.

In a further aspect, the method may include observing the determined mobile device behaviors in greater detail, generating a robust behavior signature that more fully describes the observed mobile device behaviors, and using the generated behavior signature to perform deeper analysis of the observed mobile device behaviors. In a further aspect, the method may include identifying two or more operations of the software application from the monitored API calls, and determining whether the identified two or more operations should be analyzed together as a single mobile device behavior. In a further aspect, using the light-weight behavior signature to perform behavior analysis operations may include determining a time period for which operations of the software application are to be analyzed based on information included in the light-weight behavior signature.

Further aspects include a computing device that includes means for identifying a critical data resource that requires close monitoring, means for identifying an intermediate resource associated with the critical data resource, means for monitoring API calls made by a software application when accessing the critical data resource and the intermediate resource, means for identifying mobile device resources that are consumed or produced by the API calls, means for identifying a pattern of API calls as being indicative of malicious activity by the software application, means for generating a light-weight behavior signature based on the identified pattern of API calls and the identified mobile device resources, means for using the light-weight behavior signature to perform behavior analysis operations, and means for determining whether the software application is malicious or benign based on the behavior analysis operations.

In an aspect, means for identifying mobile device resources that are consumed or produced by the API calls may include means for identifying ghost resources produced by the API calls. In a further aspect, means for identifying the intermediate resource associated with the critical data resource may include means for identifying a resource that requires API call monitoring based on API calls made by the software application to the critical data resource. In an aspect, the computing device may include means for observing mobile device behaviors over a period of time to recognize mobile device behaviors that are inconsistent with normal operation patterns, in which means for using the light-weight behavior signature to perform behavior analysis operations may include means for dynamically determining the mobile device behaviors that are to be observed based on information included in the light-weight behavior signature. In a further aspect, means for using the light-weight behavior signature to perform behavior analysis operations may include means for identifying mobile device behaviors that require deeper analysis based on information included in the light-weight behavior signature.

In a further aspect, the computing device may include means for observing the determined mobile device behaviors in greater detail, means for generating a robust behavior signature that more fully describes the observed mobile device behaviors, and means for using the generated behavior signature to perform deeper analysis of the observed mobile device behaviors. In a further aspect, the computing device may include means for identifying two or more operations of the software application from the monitored API calls, and means for determining whether the identified two or more operations should be analyzed together as a single mobile device behavior. In a further aspect, means for using the light-weight behavior signature to perform behavior analysis operations may include means for determining a time period for which operations of the software application are to be analyzed based on information included in the light-weight behavior signature.

Further aspects include a mobile computing device that includes a processor configured with processor-executable instructions to perform operations that include identifying a critical data resource that requires close monitoring, identifying an intermediate resource associated with the critical data resource, monitoring API calls made by a software application when accessing the critical data resource and the intermediate resource, identifying mobile device resources that are consumed or produced by the API calls, identifying a pattern of API calls as being indicative of malicious activity by the software application, generating a light-weight behavior signature based on the identified pattern of API calls and the identified mobile device resources, using the light-weight behavior signature to perform behavior analysis operations, and determining whether the software application is malicious or benign based on the behavior analysis operations.

In an aspect, the processor may be configured with processor-executable instructions to perform operations such that identifying mobile device resources that are consumed or produced by the API calls may include identifying ghost resources produced by the API calls. In a further aspect, the processor may be configured with processor-executable instructions to perform operations such that identifying the intermediate resource associated with the critical data resource may include identifying a resource that requires API call monitoring based on API calls made by the software application to the critical data resource. In a further aspect, the processor may be configured with processor-executable instructions to perform operations further including observing mobile device behaviors over a period of time to recognize mobile device behaviors that are inconsistent with normal operation patterns, in which using the light-weight behavior signature to perform behavior analysis operations may include dynamically determining the mobile device behaviors that are to be observed based on information included in the light-weight behavior signature.

In a further aspect, the processor may be configured with processor-executable instructions to perform operations such that using the light-weight behavior signature to perform behavior analysis operations may include identifying mobile device behaviors that require deeper analysis based on information included in the light-weight behavior signature. In a further aspect, the processor may be configured with processor-executable instructions to perform operations further including observing the determined mobile device behaviors in greater detail, generating a robust behavior signature that more fully describes the observed mobile device behaviors, and using the generated behavior signature to perform deeper analysis of the observed mobile device behaviors. In a further aspect, the processor may be configured with processor-executable instructions to perform operations further including identifying two or more operations of the software application from the monitored API calls, and determining whether the identified two or more operations should be analyzed together as a single mobile device behavior. In a further aspect, the processor may be configured with processor-executable instructions to perform operations such that using the light-weight behavior signature to perform behavior analysis operations may include determining a time period for which operations of the software application are to be analyzed based on information included in the light-weight behavior signature.

Further aspects include a non-transitory computer readable storage medium having stored thereon processor-executable software instructions configured to cause a mobile device processor to perform operations for analyzing mobile device behaviors to identify a malicious software application, the operations including identifying a critical data resource that requires close monitoring, identifying an intermediate resource associated with the critical data resource, monitoring API calls made by a software application when accessing the critical data resource and the intermediate resource, identifying mobile device resources that are consumed or produced by the API calls, identifying a pattern of API calls as being indicative of malicious activity by the software application, generating a light-weight behavior signature based on the identified pattern of API calls and the identified mobile device resources, using the light-weight behavior signature to perform behavior analysis operations, and determining whether the software application is malicious or benign based on the behavior analysis operations.

In an aspect, the stored processor-executable software instructions may be configured to cause a mobile device processor to perform operations such that identifying mobile device resources that are consumed or produced by the API calls may include identifying ghost resources produced by the API calls. In a further aspect, the stored processor-executable software instructions may be configured to cause a mobile device processor to perform operations such that identifying the intermediate resource associated with the critical data resource may include identifying a resource that requires API call monitoring based on API calls made by the software application to the critical data resource.

In a further aspect, the stored processor-executable software instructions may be configured to cause a mobile device processor to perform operations further including observing mobile device behaviors over a period of time to recognize mobile device behaviors that are inconsistent with normal operation patterns, in which using the light-weight behavior signature to perform behavior analysis operations may include dynamically determining the mobile device behaviors that are to be observed based on information included in the light-weight behavior signature. In a further aspect, the stored processor-executable software instructions may be configured to cause a mobile device processor to perform operations such that using the light-weight behavior signature to perform behavior analysis operations may include identifying mobile device behaviors that require deeper analysis based on information included in the light-weight behavior signature.

In a further aspect, the stored processor-executable software instructions may be configured to cause a mobile device processor to perform operations further including observing the determined mobile device behaviors in greater detail, generating a robust behavior signature that more fully describes the observed mobile device behaviors, and using the generated behavior signature to perform deeper analysis of the observed mobile device behaviors.

In a further aspect, the stored processor-executable software instructions may be configured to cause a mobile device processor to perform operations further including identifying two or more operations of the software application from the monitored API calls, and determining whether the identified two or more operations should be analyzed together as a single mobile device behavior. In a further aspect, the stored processor-executable software instructions may be configured to cause a mobile device processor to perform operations such that using the light-weight behavior signature to perform behavior analysis operations may include determining a time period for which operations of the software application are to be analyzed based on information included in the light-weight behavior signature.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
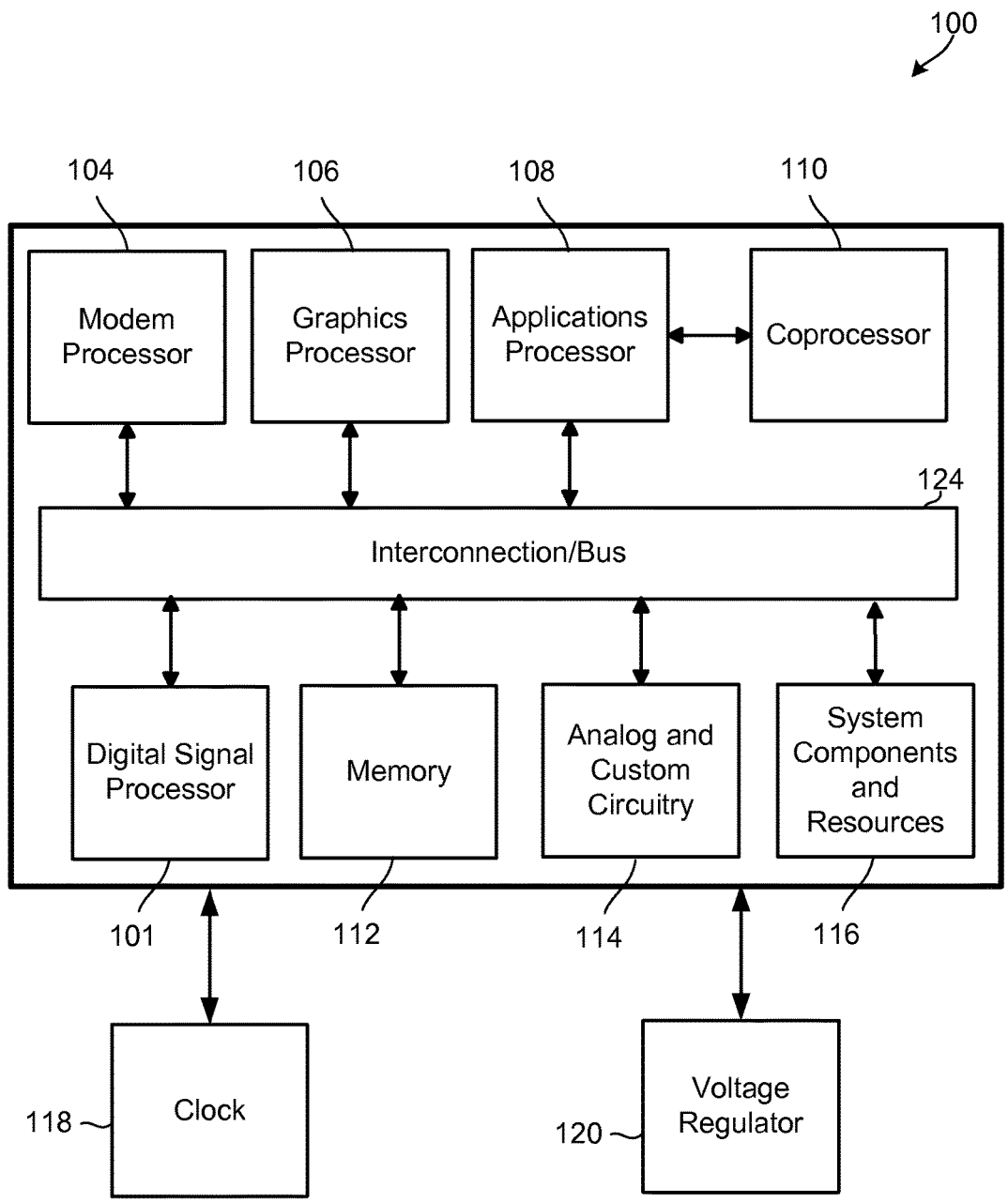
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices that have limited resources and run on battery power, such as smartphones, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

The various aspects include mobile devices, systems, and methods for efficiently identifying, preventing, and/or correcting the conditions and/or mobile device behaviors that often degrade a mobile device's performance and/or power utilization levels over time. In an aspect, an observer process, daemon, module, or sub-system (herein collectively referred to as a "module") of the mobile device may instrument or coordinate various application programming interfaces (APIs), registers, counters or other components (herein collectively "instrumented components") at various levels of the mobile device system. The observer module may continuously (or near continuously) monitor mobile device behaviors by collecting behavior information from the instrumented components, which may be accomplished by reading information from log files (e.g., API logs) stored in a memory of the mobile device. The mobile device may also include an analyzer module, and the observer module may communicate (e.g., via a memory write operation, function call, etc.) the collected behavior information to the analyzer module. The analyzer module may receive and use the behavior information to perform behavior analysis operations, which may include performing, executing, and/or applying data, algorithms, and/or models to determine whether a mobile device behavior is benign or malicious/performance-degrading.

While the above-mention behavioral monitoring and analysis system is generally very effective for preventing the degradation in performance and power utilization levels of a mobile device over time, malicious software applications are growing in sophistication and may evade detection by such systems by delaying or otherwise masking their operations. For example, when stealing information from a user's address book, a malicious software application might attempt to evade detection by accessing the address book, encoding the information, and storing the encoded information in a new generic file that is separate from the address book files. The malicious application may then wait a few days before retrieving the information from the generic file and sending the information to a server.

Typically, the above-mentioned behavioral monitoring and analysis system (i.e., observer and analyzer modules) would be able to determine that this sequence of operations (i.e., reading, storing, and transmitting address book data) is not consistent with normal operating patterns of the device, and classify this behavior as malicious. However, due to the time delay in the sequence of operations, it may be challenging for the system to determine that these individual operations analyzed/evaluated together as part of a single malicious mobile device behavior attempting to mask its true nature through an intermediate operation and delay between two or more operations. That is, individually, the operations of accessing address data, encoding data, storing the data in a generic (or "ghost") file, and transmitting information stored in a generic/ghost file are not necessarily indicative of a malicious activity or mobile device behavior. Rather, it is the sequential performance of these operations that is indicative of malicious activity or mobile device behavior. Further, the strongest indicator that this activity/behavior is malicious may be the reading and storing of address book data in a file, which might be difficult to recognize when the operation is masked by transferring it to a generic/ghost file that is not associated with the original data source (e.g., an address book database) and is not read or transmitted until after a delay, such as a few minutes, hours or days. For all these reasons, it may be challenging for the behavioral monitoring and analysis system to identify and classify such sequences of operations as belonging to the same mobile device behavior and/or as being malicious or not consistent with normal operating patterns of the device.

One way to detect and determine that a sequence of operations is associated with a single malicious behavior/activity is by performing data flow tracking operations. Data flow tracking solutions, such as FlowDroid, are generally effective tools for preventing malicious software applications from evading detection. Briefly, data flow tracking solutions monitor many or all of the data operations (reads, writes, data encoding, data transmissions, etc.) in a computing system and attempt to identify the software applications that are using the data improperly.

However, data flow tracking solutions require monitoring many of the data flows and data operations in the computing system and/or require the execution of very complex and power-intensive processes. As such, data flow tracking solutions are not suitable for use in mobile devices, which are typically resource constrained systems that have relatively limited processing, memory, and energy resources. In addition, modern mobile devices are complex systems, and it is often not feasible to evaluate all of the various data flows, data operations (reads, writes, data encoding, data transmissions, etc.), processes, components, behaviors, or factors (or combinations thereof) that may be malicious or otherwise contribute to the performance degradation of the mobile device. For these and other reasons, data flow tracking solutions are not suitable for use in mobile devices.

The various aspects include a behavioral monitoring and analysis system configured to efficiently identify malicious software applications and prevent them from degrading the mobile device's performance and/or power utilization levels over time. The behavioral monitoring and analysis system may be further configured to prevent malicious software applications from evading detection by delaying some operations, using "ghost" files, or otherwise masking malicious operations. The behavioral monitoring and analysis system may be configured to accomplish this without monitoring data flows or performing data flow tracking operations in the mobile device.

In an aspect, the observer module may be configured to identify the critical data resources (e.g., address book, camera, etc.) that are susceptible to misuse and/or require close monitoring, and monitor and store all API calls made by a software application that involve, impact, or access the critical resources (including identified intermediate or ghost resources). The observer module may identify a sequence or a pattern of API calls as being suspicious or indicative of a malicious activity or behavior, generate a light-weight behavior signature from this identified sequence/pattern of API calls, and send this light-weight behavior signature to the analyzer module for analysis. The observer module may send this light-weight behavior signature to the analyzer module separate from, and in addition to, the behavior information collected as part of the normal monitoring operations. The analyzer module may receive and use the light-weight behavior signature to determine which sequences of operations (identified via API calls) should be analyzed together as a single mobile device behavior and/or which mobile device behaviors require additional, different, or deeper analysis. By monitoring API calls to determine which operations should be evaluated closer or as part of a single behavior, the behavioral monitoring and analysis system may prevent malicious software applications from avoiding detection by delaying or otherwise masking malicious operations without tracking of the content of data or data flows in the mobile device.

As a simple example, when a software application reads information from a user's address book, the system writes to the API log an entry to indicate that the application has read information from a critical resource (i.e., the address book). Then, when that application sends information to a server, the system writes to the API log to indicate that the application subsequently sent information to a server. While these individual operations are not malicious, the sequence of operations may indicate that this application should be monitored more closely by the analyzer module. The observer module may identify such sequences of operations without evaluating the content of the data that is read or sent. The observer module only monitors the sequence of API calls (i.e., read and send) to determine if there is a possibility that the application is performing malicious activities, and thus does not track the content of data or data flows in the mobile device. The collection of APIs that are called with respect to a critical resource (e.g., address book) may be used by the observer module to generate an adequate and light-weight behavioral signature that may be used by analyzer module to better determine whether a mobile device behavior or application is malicious or benign.

The various aspects may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 102, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 2:
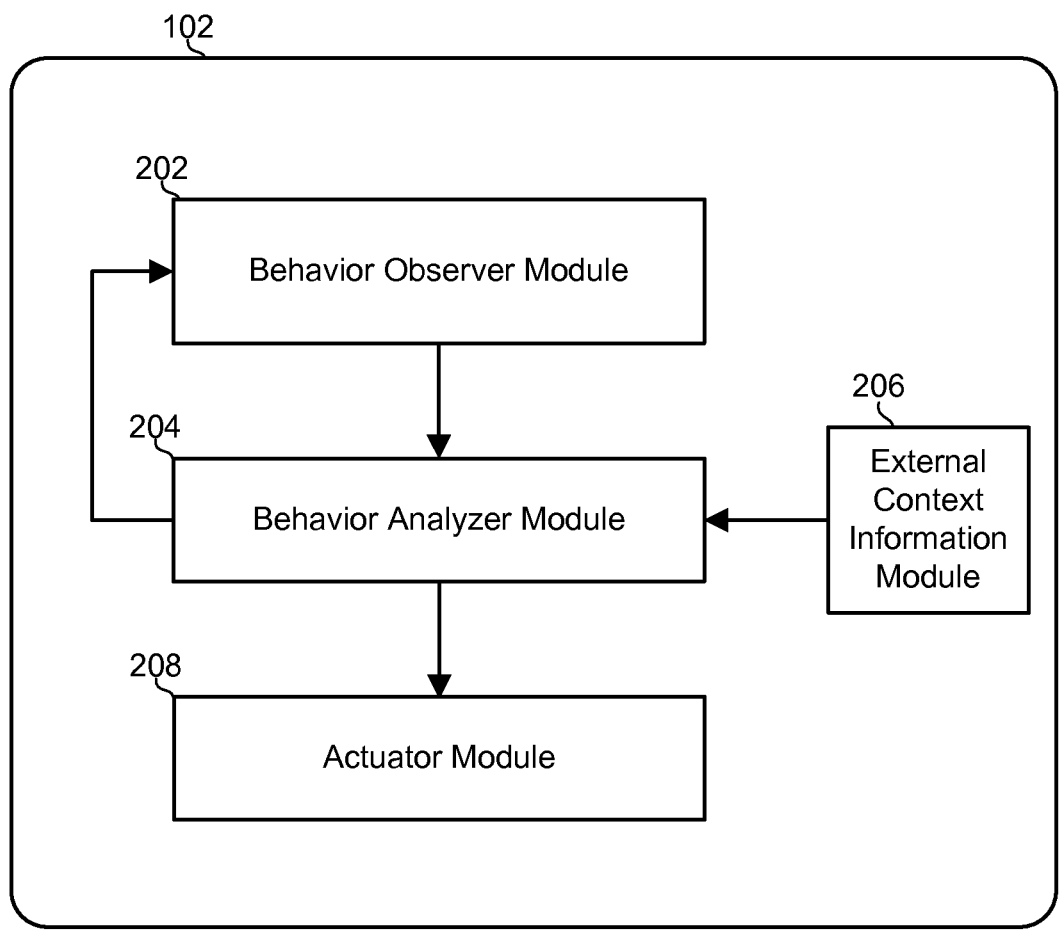
FIG. 2 is a block diagram illustrating example logical components and information flows in an aspect mobile device configured to determine whether a particular mobile device behavior, software application, or process is performance-degrading, suspicious, or benign.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a behavior observer module 202, a behavior analyzer module 204, an external context information module 206, and an actuator module 208. In an aspect, the behavior analyzer module 204 may include a classifier module (not illustrated) and/or one or more classifiers.

Each of the modules 202-208 may be implemented in software, hardware, or any combination thereof. For example, in an aspect, one or more of the modules 202-208 may be implemented as software instructions executing on one or more processors of the mobile device 102. In various aspects, the modules 202-208 may be implemented within parts of the operating system (e.g., within the kernel, in the kernel space, in the user space, etc.), within separate programs or applications, in specialized hardware buffers or processors, or any combination thereof.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, store the generated observations in a memory (e.g., in a log file, cache memory, etc.) and/or send (e.g., via memory writes, function calls, etc.) the generated observations to the behavior analyzer module 204. In various aspects, the generated observations may be stored as a behavior vector and/or in an API log file or structure.

The behavior observer module 202 may monitor/observe mobile device operations and events by collecting information pertaining to library API calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor/observe data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor/observe system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count value or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle-to-vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

The behavior observer module 202 may be configured to generate behavior vectors that include a concise definition of the observed behaviors. Each behavior vector may succinctly describe observed behavior of the mobile device, software application, or process in a value or vector data-structure (e.g., in the form of a string of numbers, etc.). A behavior vector may also function as an identifier that enables the mobile device system to quickly recognize, identify, and/or analyze mobile device behaviors. In an aspect, the behavior observer module 202 may generate a behavior vector that includes series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), etc.

To reduce the number of factors monitored to a manageable level, in an aspect, the behavior observer module 202 may be configured to perform coarse observations by monitoring/observing an initial set of behaviors or factors that are a small subset of all factors that could contribute to the mobile device's degradation. In various aspects, the behavior observer module 202 may receive the initial set of behaviors and/or factors from other mobile devices, a network server, or a component in a cloud service or network. In an aspect, the initial set of behaviors/factors may be specified in data/behavior models received from the other mobile device, network server or cloud service/network. In an aspect, the initial set of behaviors/factors may be specified in a reduced feature model (RFMs).

The behavior analyzer module 204 may receive the observations, behavior vectors, and/or collected behavior information from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to an actuator module, which may perform various operations to operations to heal, cure, isolate, or otherwise fix the identified problem.

The behavior analyzer module 204 may receive the behavior vectors and compare them to one or more behavior modules to determine whether a particular mobile device behavior, software application, or process is performance-degrading/malicious, benign, or suspicious. When it is determined that a behavior, software application, or process is malicious or performance-degrading, the behavior analyzer module 204 may notify the actuator module 208, which may perform various actions or operations to correct mobile device behaviors determined to be malicious or performance-degrading and/or perform operations to heal, cure, isolate, or otherwise fix the identified problem.

When the behavior analyzer module 204 determines that a behavior, software application, or process is suspicious, the analyzer module 204 may notify the behavior observer module 202, which may adjust the adjust the granularity of its observations (i.e., the level of detail at which mobile device behaviors are observed) and/or change the behaviors that are observed based on information received from the analyzer module 204 (e.g., results of the real-time analysis operations), generate or collect new or additional behavior information, and send the new/additional information to the behavior analyzer module 204 for further analysis/classification. Such feedback communications between the behavior observer module 202 and the analyzer module 204 enable the mobile device 102 to recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

Thus, the analyzer module 204 may be configured to receive the coarse observations from the observer module 202 and identify subsystems, processes, and/or applications associated with the received coarse observations that may potentially contribute to the mobile device's degradation. This may be achieved by, for example, the analyzer module 204 comparing the received information with contextual information received from the external context information module 206.

The analyzer module 204 may instruct the observer module 202 to perform or enable deeper logging/observations or final logging on the identified subsystems, processes or applications. The observer module 202 may perform deeper observations on the identified subsystems, processes or applications. The observer module 202 may send the results of the deeper observations to the analyzer module 204 for further (and deeper) analysis. These operations may be repeated until the source of a problem is identified or until it is determined that the identified subsystems, processes or applications are not likely to cause problems or degradation. The analyzer module 204 may then send the results of the analysis to the actuation module 208, which may receive the results and perform operations to heal, cure, isolate, or otherwise fix the identified problem.

The observer module 202 and the analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the observer module 202 enables the computing system 200 to efficiently identify and prevent problems from occurring on mobile devices without requiring a large amount of processor, memory, or battery resources on the device.

The observer module 202 may provide the system with various observer modes to enable multi-level logging (e.g., fine grained and coarse-grained logging). The observer module 202 may provide the ability to automatically and dynamically switch between the different observer modes. The observer module 202 may monitor and restrict process/application that may exhaust system resources. The observer module 202 may manage communications (e.g., non-secure to secure world) overhead, such that the overhead is minimal and flow control is maintained/performed efficiently.

In an aspect, the observer module 202 may be configured to store the behavior information as observations in a space efficient and query-service-time efficient manner to reduce the performance-impact on benign applications and the mobile device.

Figure 3:
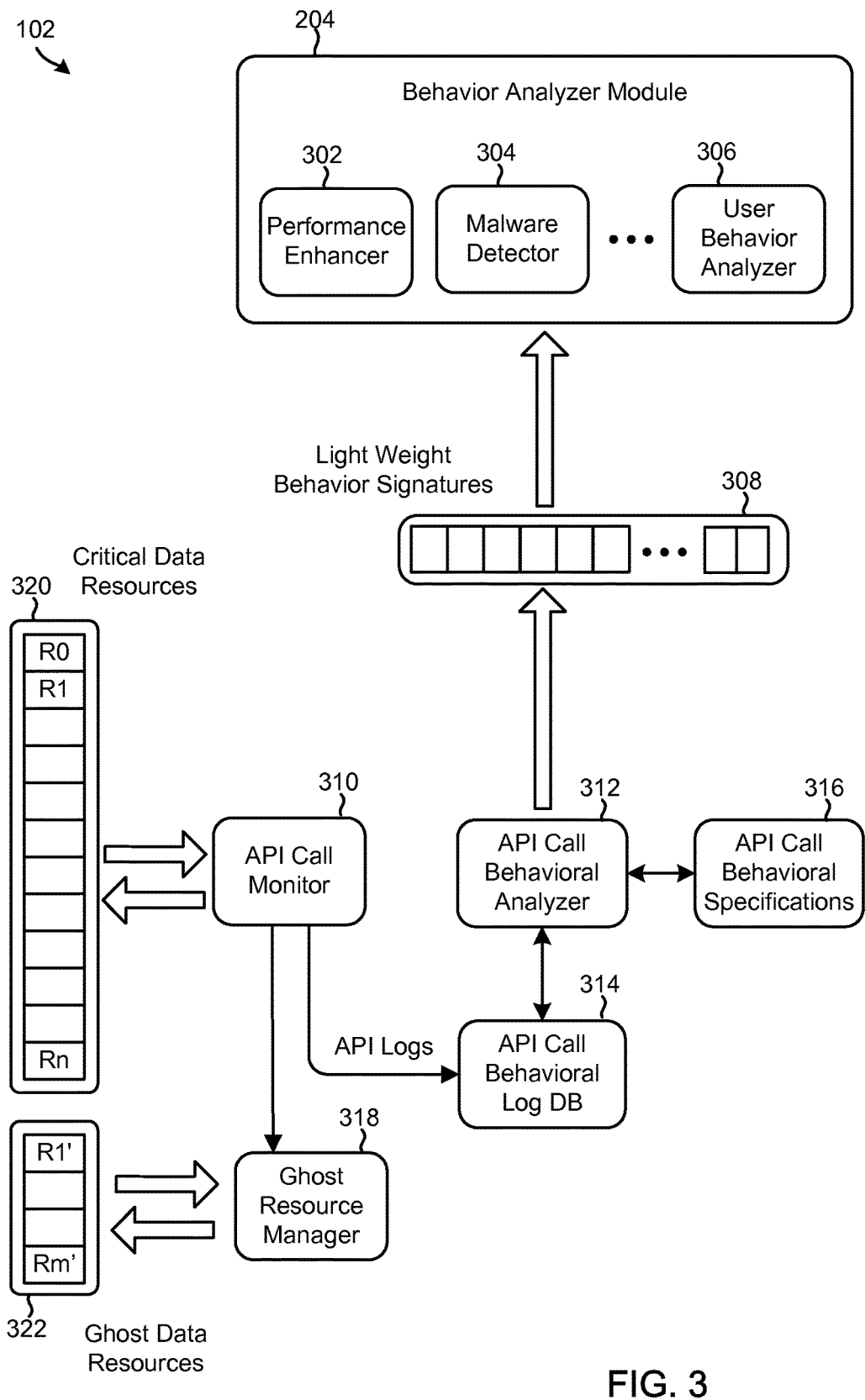
FIG. 3 is a block diagram illustrating example logical components and information flows in an aspect mobile device configured to prevent malicious software applications from avoiding detection in accordance with an aspect.

FIG. 3 illustrates example logical components and information flows in an aspect mobile device 102 configured to prevent malicious software applications from avoiding detection in accordance with an aspect. In the example illustrated in FIG. 3, the mobile device 102 includes a behavior analyzer module 204 that includes a performance enhancer module 302, a malware detector module 304, and a user behavior analyzer module 306. The mobile device 102 also includes an API call monitor module 310, an API call behavior analyzer module 312, an API call behavioral log database module 314, an API call behavior specifications module 316, and a ghost resource manager module 318, and or all of which may be included in the behavior observer module 202 illustrated in FIG. 2. For example, in an aspect, the API call monitor module 310 may be included in the behavior observer module 202 and modules 312-318 may be implemented as separate and independent modules. In another aspect, all of the modules 310-318 may be included in the behavior observer module 202.

The mobile device 102 may also include a critical data resources module 320 and a ghost data resources module 322. The critical data resources module 320 may store a list of data resources (e.g. address book, camera, etc.) that are susceptible to misuse and/or determined to require close monitoring. The mobile device 102 may be configured to dynamically update/change the list of critical data resources based on feedback from the behavior analyzer module, heuristics, machine learning, historical information, current usage, events or conditions detected in the mobile device, information received from a server, user configuration, and/or other similar criteria, factors, events, or conditions.

The ghost data resources module 322 may store a list of intermediate resources that are determined to require monitoring in order to keep track of the usage of a critical resource. For example, when a software application reads information from a critical resource of the mobile device (e.g., an address book, etc.) and writes the information to a generic or ghost file, the mobile device 102 may determine that the generic/ghost file is an intermediate resource that requires monitoring to properly keep track of the critical resource (i.e., the address book).

The API call monitor module 310 may be configured to monitor API calls at various levels of the software stack that relate to a critical resource identified in the critical data resources module 320. This may be accomplished by collecting behavior information from instrumented components relating to the critical resources and/or by reading information from API logs generated by the critical resources. The API call monitor module 310 send the API logs for these resources/operations to the API call behavioral log database module 314 for storage in a memory of the mobile device 102. The API call monitor module 310 may also identify additional resources that require monitoring, determine that the continued monitor of a critical resource is not likely to provide useful information, and add or remove resources to the list of data resources stored in the critical data resources module 320 accordingly.

The critical data resources module 320 may send information suitable for identifying an intermediate or ghost resource to the ghost resource manager module 318. Based on this information, the ghost resource manager module 318 may identify the intermediate/ghost resources that require monitoring, and manage the addition and/or removal of the ghost resources to the list of intermediate resources stored by the ghost data resources module 322.

The API call behavior analyzer module 310 may be configured to compare and/or analyze information received from the API call behavioral log database module 314 with behavioral specification models received from the API call behavioral specifications module 316 to identify suspicious sequences or patterns of API calls that are indicative of a malicious activity or behavior, to identify the operations that should be evaluated together as part of a single mobile device behavior, and/or to identify critical resources that require closer monitoring or scrutiny by the behavior analyzer module 204. The API call behavior analyzer module 310 may generate concise and light-weight behavior signatures 308 for each critical resource based on the result of the comparison and/or analysis operations, and send these light-weight behavior signatures 309 to the behavior analyzer module 204 for analysis.

The behavior analyzer module 204 may receive and use the light-weight behavior signatures 308 to quickly and efficiently determine the sequences of operations that should be analyzed together as a single mobile device behavior and/or the mobile device behaviors that require additional, different, or deeper analysis. For example, the behavior analyzer module 204 may determine that all API calls relating a critical resource and its associated ghost resources logged in the past week should be analyzed together as a single mobile device behavior.

Figure 4:
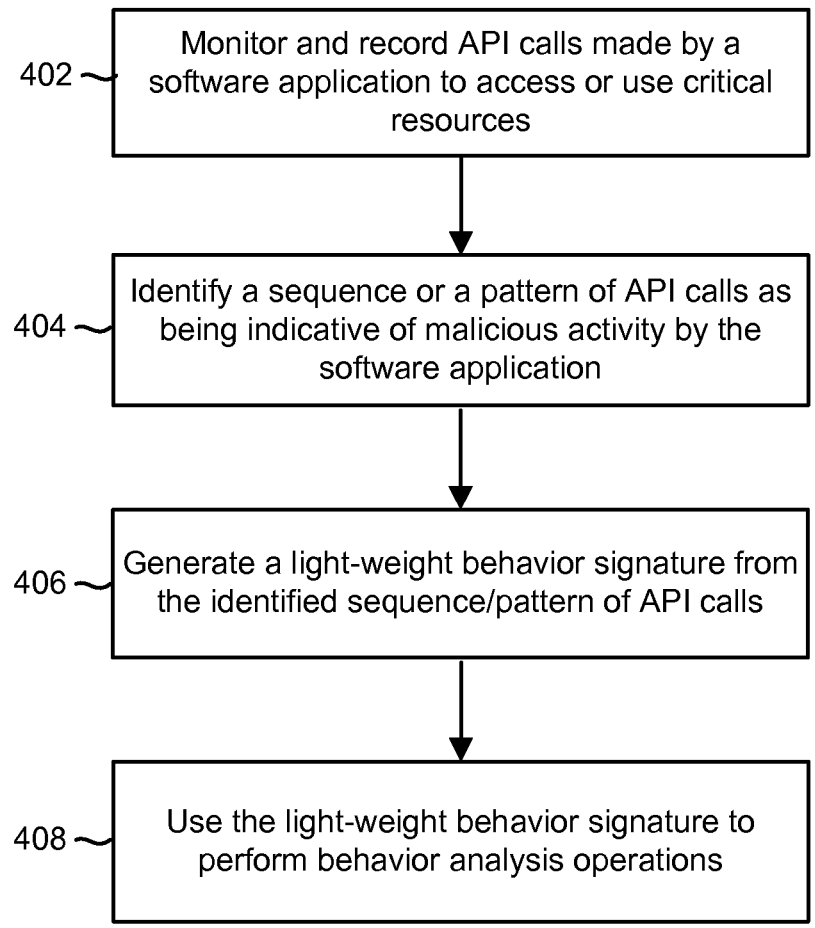
FIG. 4 is a process flow diagram illustrating a method of performing behavior monitoring and analysis operations to determine whether a particular software application is malicious or benign so as to prevent malicious software applications from avoiding detection.

FIG. 4 illustrates a method 400 of performing behavior monitoring and analysis operations in accordance with an aspect. Method 400 may be performed by a processing core of a mobile device. In block 402, the processing core may monitor and record all API calls that are made a software application when accessing or using critical resources. In block 404, the processing core may identify a sequence or pattern of API calls that is indicative of malicious activity by the software application. In block 406, the processing core may generate a light-weight behavior signature from the identified sequence or pattern of API calls. In bock 408, the processing core may use the light-weight behavior signature to perform behavior analysis operations, which may include performing, executing, and/or applying data, algorithms, and/or models to determine whether the software application is benign or malicious.

Figure 5:
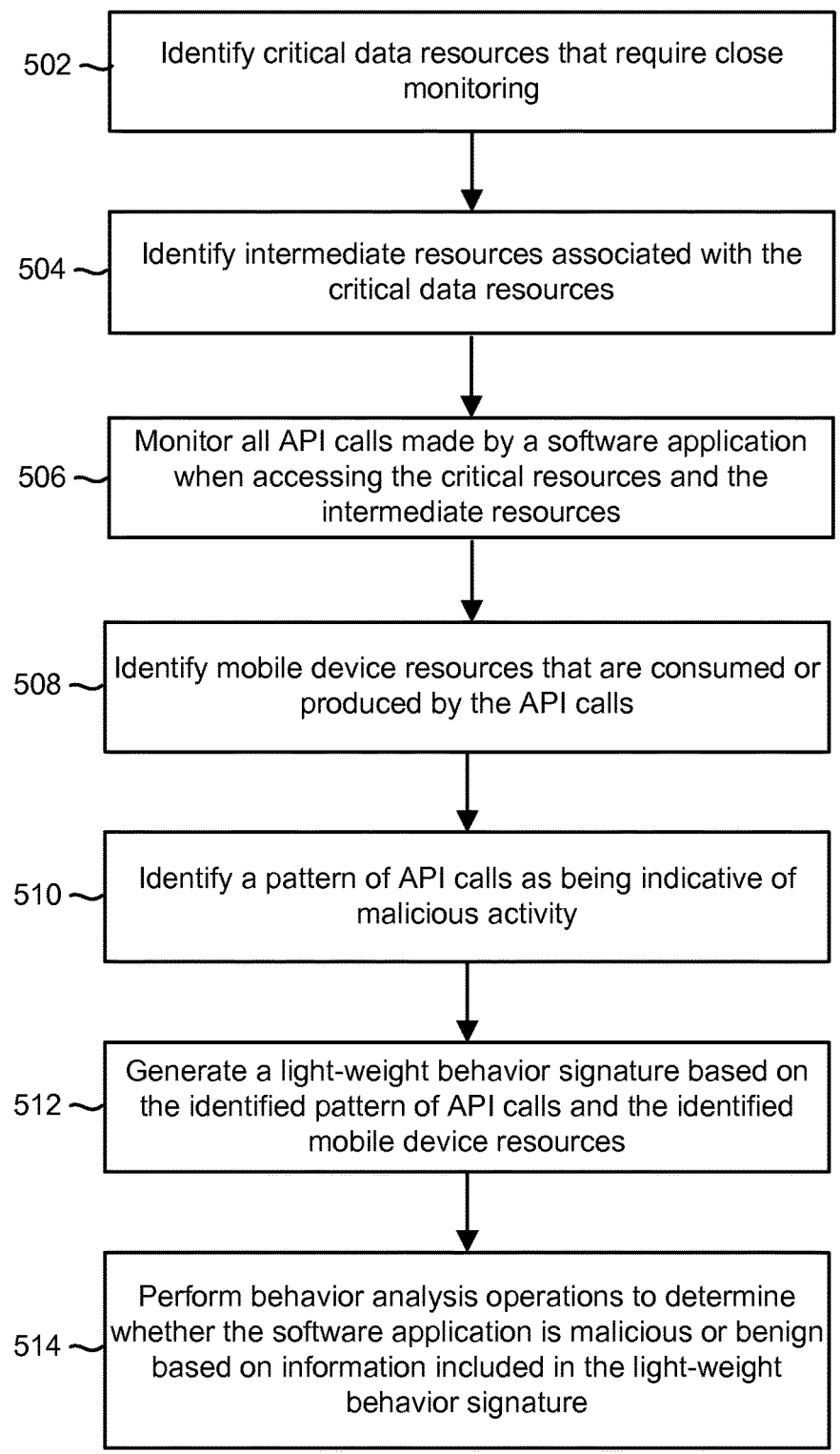
FIG. 5 is a process flow diagram illustrating another method of performing behavior monitoring and analysis operations to determine whether a particular software application is malicious or benign so as to prevent malicious software applications from avoiding detection.

FIG. 5 illustrates an aspect method 500 of analyzing mobile device behaviors to identify a malicious software application so as to prevent the malicious software application from evading detection by delaying or otherwise masking malicious operations. Method 500 may be performed by a processing core of a mobile device. In block 502, the processing core may identify critical data resources that require close monitoring. In block 504, the processing core may identify intermediate resources that are associated with the critical data resources and/or used by the software application in conjunction with a critical data resource. In block 506, the processing core may monitor all API calls made by the software application when accessing the critical resources and when accessing the intermediate resources. In block 508, the processing core may identify regular or ghost resources that are consumed or produced by the API calls. In block 510, the processing core may identify a pattern of API calls as being indicative of malicious activity. In block 512, the processing core may generate a light-weight behavior signature based on the identified pattern of API calls and the identified resources. In block 514, the processing core may perform behavior analysis operations and determine whether the software application is malicious or benign based on the information included in the light-weight behavior signature.

Figure 6:
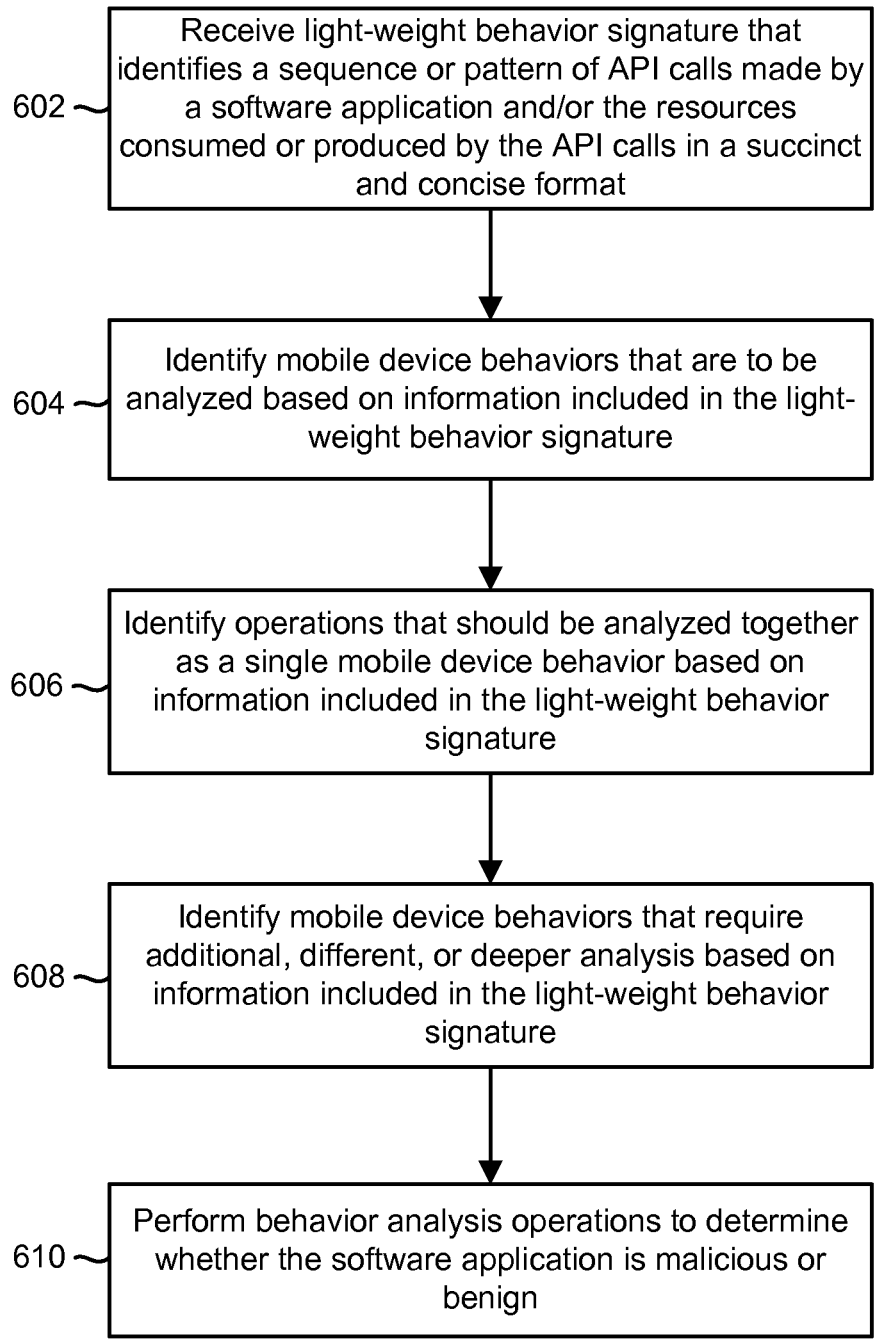
FIG. 6 is a process flow diagram illustrating an analyzer method of using information included in a light-weight behavior vector to identify the mobile device behaviors that are to be observed, identify operations that should be analyzed together as part of a single mobile device behavior, and to identify the mobile device behaviors that require additional, different, or deeper analysis.

FIG. 6 illustrates an aspect method 600 of performing behavior analysis operations based on information included in a light weight behavior signature. Method 600 may be performed by a processing core of a mobile device. In block 602, the processing core may receive a light-weight behavior signature that identifies a sequence or pattern or API calls that were made by a software application. In block 604, the processing core may identify mobile device behaviors that are to be analyzed based on information included in the light-weight behavior signature. In block 606, the processing core may identify two or more operations that should be analyzed together as part of a single mobile device behavior based on information included in the light-weight behavior signature. In block 608, the processing core may identify mobile device behaviors that require additional, different, and/or deeper analysis based on the information included in the light-weight behavior signature. In block 610, the processing core may perform behavior analysis operations to determine whether the software application is benign or malicious.

Figure 7:
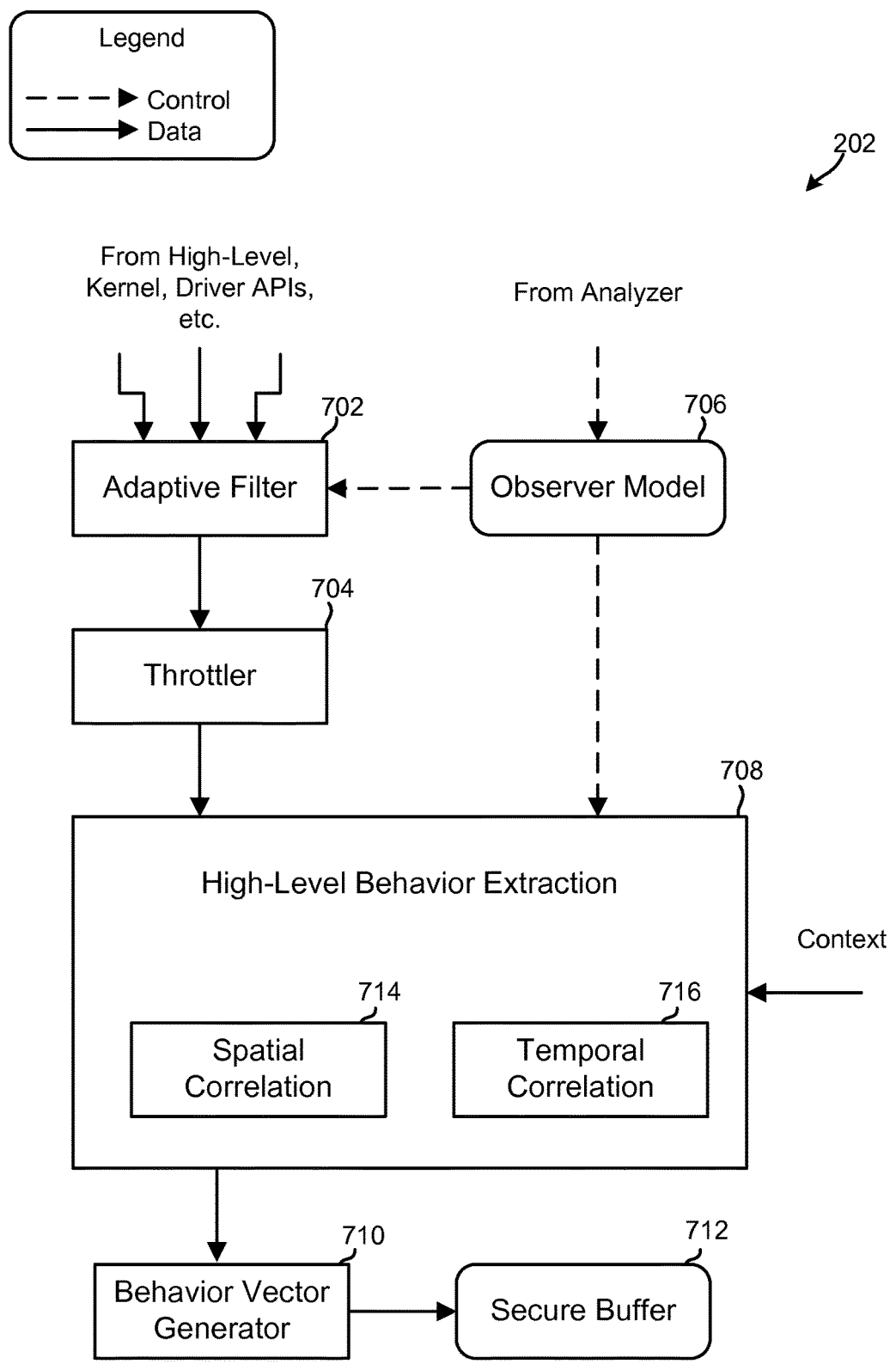
FIGS. 7 and 8 are block diagrams illustrating logical components and information flows in a computing system implementing observer modules and observer daemons in accordance with the various aspects.

FIG. 7 illustrates example logical components and information flows in a behavior observer module 202 of a computing system configured to perform dynamic and adaptive observations in accordance with an aspect. The behavior observer module 202 may include an adaptive filter module 702, a throttle module 704, an observer mode module 706, a high-level behavior extraction module 708, a behavior vector generator 710, and a secure buffer 712. The high-level behavior extraction module 708 may include a spatial correlation module 714 and a temporal correlation module 716.

The observer mode module 706 may receive control information from various sources, which may include an analyzer unit (e.g., the behavior analyzer module 204 described above with reference to FIG. 2) and/or an application API. The observer mode module 706 may send control information pertaining to various observer modes to the adaptive filter module 702 and the high-level behavior extraction module 708.

The adaptive filter module 702 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 704, which may be responsible for controlling the amount of information flowing from the filter to ensure that the high-level behavior extraction module 708 does not become flooded or overloaded with requests or information.

The high-level behavior extraction module 708 may receive data/information from the throttle module 704, control information from the observer mode module 706, and context information from other components of the mobile device. The high-level behavior extraction module 708 may use the received information to perform spatial and temporal correlations to detect or identify high level behaviors that may cause the device to perform at sub-optimal levels. For example, the temporal correlation module 716 may determine that a camera activity occurred at T0 and communication activity occurred at time T1, and that the difference between T0 and T1 is less than 100 ms from the same application, and thus there is a suspicious temporal correlation in the observed behavior that may require additional to deeper observations or analysis. In this scenario, the spatial correlation module 714 may determine that the camera activity at T0 was performed without any user interaction, and thus the suspicion level should be higher. The results of these and other spatial and temporal correlations may be sent to the behavior vector generator 710, which may receive the correlation information and generate a behavior vector that describes the behaviors of particular process, application, or sub-system.

In an aspect, the behavior vector generator 710 may generate the behavior vector such that each high-level behavior of a particular process, application, or sub-system is an element of the behavior vector. In an aspect, the generated behavior vector may be stored in a secure buffer 712. Examples of high-level behavior detection may include detection of the existence of a particular event, the amount or frequency of another event, the relationship between multiple events, the order in which events occur, time differences between the occurrence of certain events, etc, any or all of which may be determined based on information stored in the API logs.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques and control the observation granularity based on information received from a variety of sources. For example, the high-level behavior extraction module 708 may receive information from the throttle module 704, the observer mode module 706, and context information received from other components (e.g., sensors) of the mobile device. As an example, a high-level behavior extraction module 708 performing temporal correlations might detect that a camera has been used and that the mobile device is attempting to upload the picture to a server. The high-level behavior extraction module 708 may also perform spatial correlations to determine whether an application on the mobile device took the picture while the device was holstered and attached to the user's belt. The high-level behavior extraction module 708 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior extraction module 708 may recognize this as a potentially threatening behavior and initiate an appropriate response (e.g., shutting off the camera, sounding an alarm, etc.).

In an aspect, the behavior observer module 202 may be implemented in multiple parts.

Figure 8:
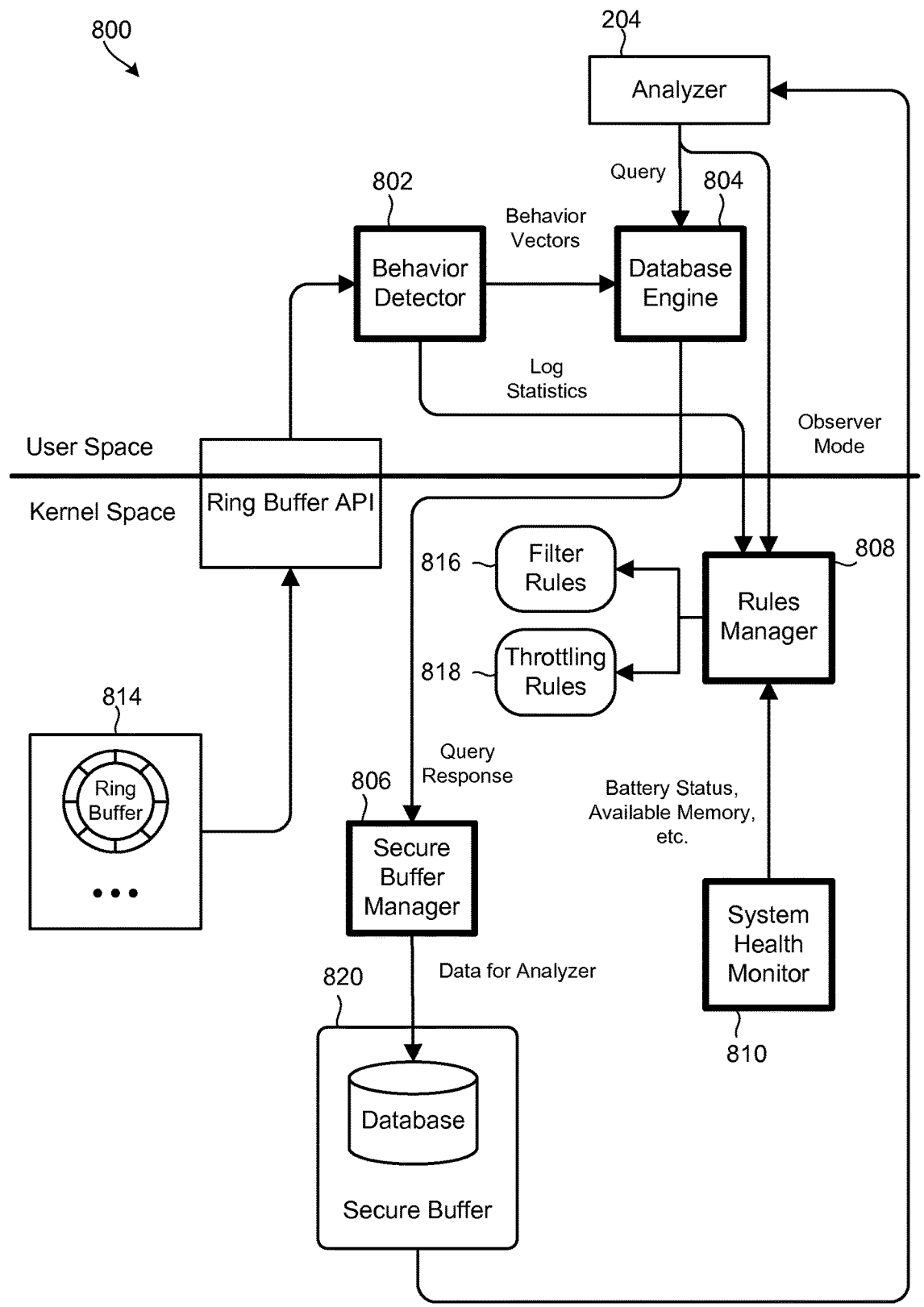

FIG. 8 illustrates logical components and information flows in a computing system 800 implementing an aspect observer daemon. In the example illustrated in FIG. 8, the computing system 800 includes a behavior detector 802 module, a database engine 804 module, and a behavior analyzer module 204 in the user space, and a ring buffer 814, a filter rules 816 module, a throttling rules 818 module, and a secure buffer 820 in the kernel space. The computing system 800 may further include an observer daemon that includes the behavior detector 802 and the database engine 804 in the user space, and the secure buffer manager 806, the rules manager 808, and the system health monitor 810 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 9:
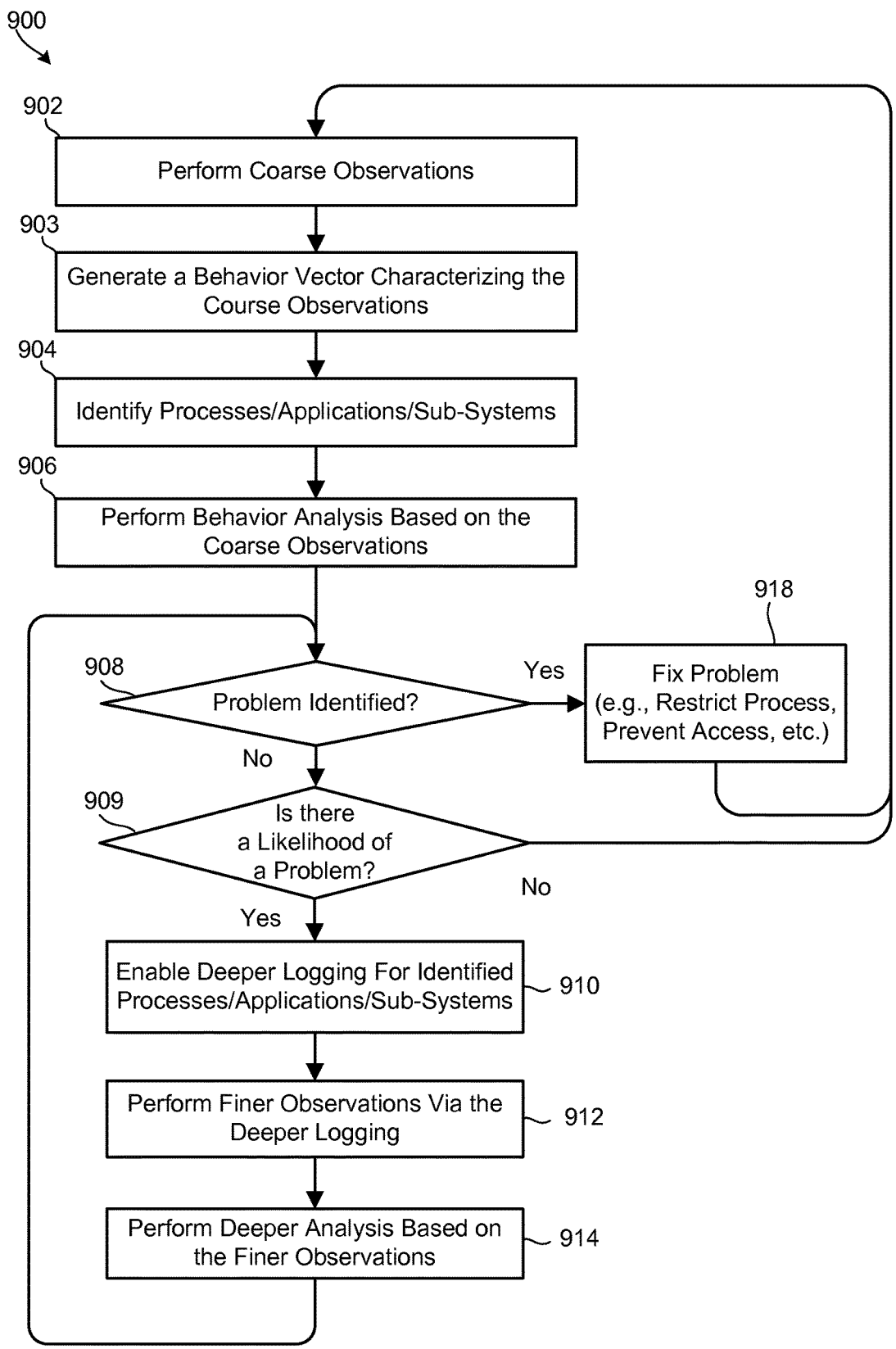
FIG. 9 is a process flow diagram illustrating an aspect method for performing adaptive observations on mobile devices.

FIG. 9 illustrates an example method 900 for performing dynamic and adaptive observations in accordance with an aspect. In block 902, the mobile device processor may perform coarse observations by monitoring/observing a subset of large number factors/behaviors that could contribute to the mobile device's degradation. In block 903, the mobile device processor may generate a behavior vector characterizing the coarse observations and/or the mobile device behavior based on the coarse observations. In block 904, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 906, the mobile device processor may perform behavioral analysis operations based on the coarse observations. In determination block 908, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 908="Yes"), in block 918, the processor may initiate a process to correct the behavior and return to block 902 to perform additional coarse observations.

When the mobile device processor determines that the suspicious behaviors or potential problems can not be identified and/or corrected based on the results of the behavioral analysis (i.e., determination block 908="No"), in determination block 909 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 909="No"), the processor may return to block 902 to perform additional coarse observations.

When the mobile device processor determines that there is a likelihood that suspicious behaviors or potential problems exist and/or are detectable (i.e., determination block 909="Yes"), in block 910, the mobile device processor may perform deeper logging/observations or final logging on the identified subsystems, processes or applications. In block 912, the mobile device processor may perform deeper and more detailed observations on the identified subsystems, processes or applications. In block 914, the mobile device processor may perform further and/or deeper behavioral analysis based on the deeper and more detailed observations. In determination block 908, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 908="No"), the processor may repeat the operations in blocks 910-914 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 908="Yes"), in block 918, the mobile device processor may perform operations to correct the problem/behavior, and the processor may return to block 902 to perform additional operations.

In an aspect, as part of blocks 902-918 of method 900, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 10:
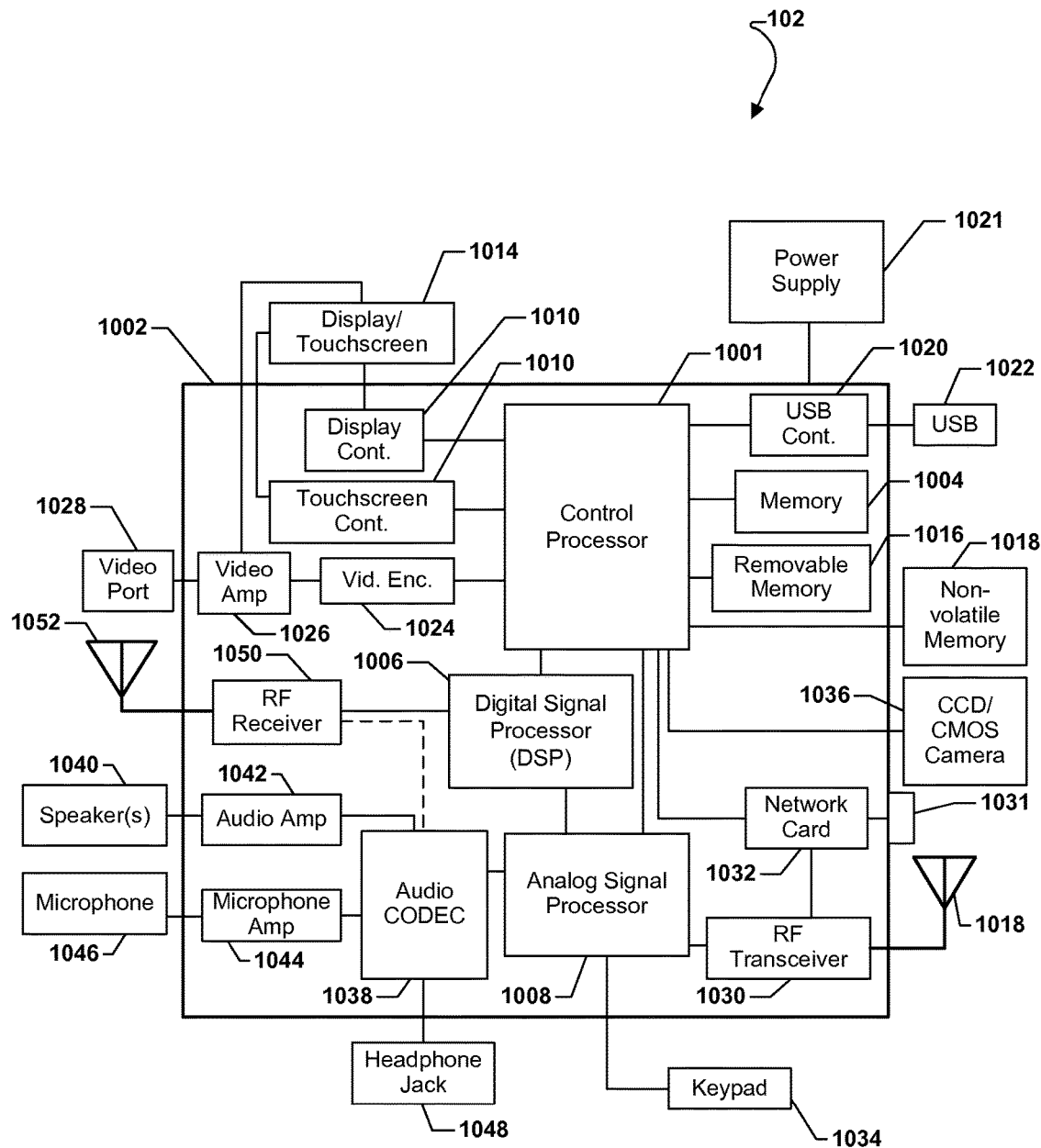
FIG. 10 is a component block diagram of mobile device suitable for use with the various aspects.

Example components and modules of an exemplary, non-limiting aspect of such a mobile device 102 are illustrated in FIG. 10. A mobile computing device 102 may include a circuit board 1002 of electronic components, some or all of which may be integrated into an on-chip system, that includes a control processor 1001 coupled to memory 1004. The control processor 1001 may further be coupled to a digital signal processor 1006 and/or an analog signal processor 1008, which also be coupled together. In some aspects, the control processor 1001 and a digital signal processor 1006 may be the same component or may be integrated into the same processor chip. A display controller 1008 and a touchscreen controller 1012 may be coupled to the control processor 1001 and to a display/touchscreen 1014 within or connected to the mobile computing device 102.

The control processor 1001 may also be coupled to removable memory 1016 (e.g., an SD memory or SIM card in the case of mobile computing devices) and/or to external memory 1018, such as one or more of a disk drive, CD drive, and a DVD drive. The control processor 1001 may also be coupled to a Universal Serial Bus (USB) controller 1020 which couples to a USB port 1022. In various aspects, a power supply 1021 may be coupled to the circuit board 1002 through the USB controller 1020 or through different electrical connections to provide power (e.g., DC power) to the various electronic components.

The control processor 1001 may also be coupled to a video encoder 1024, e.g., a phase alternating line (PAL) encoder, a sequential couleur a memoire (SECAM) encoder, or a national television system(s) committee (NTSC) encoder. Further, the video encoder 1024 may be coupled to a video amplifier 1026 which may be coupled to the video encoder 1024 and the display/touchscreen 1014. Also, a video port 1028 may be coupled to the video amplifier 1026 to enable connecting the mobile computing device 102 to an external monitor, television or other display (not shown).

The control processor 1001 may be coupled to a radio frequency (RF) transceiver 1030, such as via an analog signal processor 1008. The RF transceiver 1030 may be coupled to an RF antenna 1018 for transmitting and receiving RF signals. The RF transceiver 1030 may be configured to transmit and receive communication signals of one or more different wireless communication protocols including, for example, cellular telephone (e.g., G-3, UMTS, CDMA, etc.), WiFi, WiMax, and Bluetooth.

The control processor 1001 may further be coupled to a network card 1032 which may be coupled to a network connector 1031 and/or the RF transceiver 1030 and configured to enable communications via an external network (e.g., local area networks, the Internet, an intranet, WiFi networks, Bluetooth networks, personal area network (PAN) etc.) The network card 1032 may be in the form of a separate chip or card, or may be implemented as part of the control processor 1001 or the RF transceiver 1030 (or both) as a full solution communication chip.

A number of analog devices may be coupled to the control processor 1001 via the analog signal processor 1008, such as a keypad 1034. In other implementations, a keypad or keyboard may include its own processor so that the interface with the control processor 1001 may be via direct connection (not shown), via a network connection (e.g., via the network card), or via the USB port 1022.

In some implementations, a digital camera 1036 may be coupled to the control processor 1001. In an exemplary aspect, the digital camera 1036 may be a charge-coupled device (CCD) camera or a complementary metal-oxide semiconductor (CMOS) camera. The digital camera 1036 may be built into the mobile computing device 102 or coupled to the device by an external cable.

In some implementations, an audio CODEC 1038 (e.g., a stereo CODEC) may be coupled to the analog signal processor 1008 and configured to send sound signals to one or more speakers 1040 via an audio amplifier 1042. The audio CODEC 1038 may also be coupled to a microphone amplifier 1044 which may be coupled to a microphone 1046 (e.g., via a microphone jack). A headphone jack 1048 may also be coupled to the audio CODEC 1038 for outputting audio to headphones.

In some implementations, the mobile computing device 102 may include a separate RF receiver circuit 1050 which may be coupled to an antenna 1052 for receiving broadcast wireless communication signals. The receiver circuit 1050 may be configured to receive broadcast television signals (e.g., EBMS broadcasts), and provide received signals to the DSP 1006 for processing. In some implementations, the receiver circuit 1050 may be configured to receive FM radio signals, in which case the received signals may be passed to the Audio CODEC 1038 for processing.

In an aspect, processor-executable instructions for accomplishing one or more of the method operations described above may be stored in the internal memory 1004, removable memory 1016 and/or non-volatile memory 1018 (e.g., as on a hard drive, CD drive, or other storage accessible via a network). Such processor-executable instructions may be executed by the control processor 1001 in order to perform the methods described herein.

Figure 11:
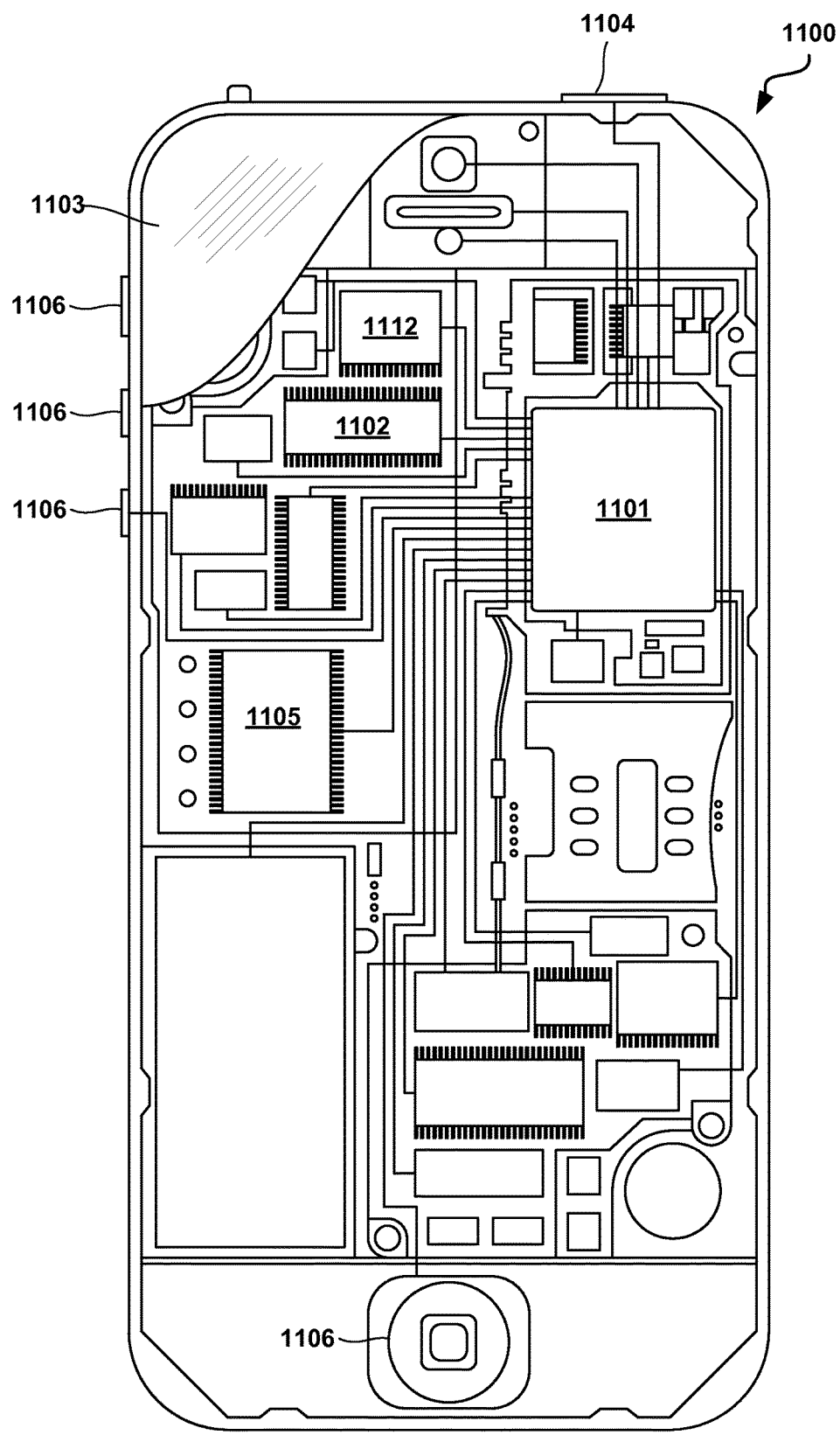
FIG. 11 is an illustration of an example mobile device suitable for use with the various aspects.

The various aspects may be implemented on a variety of mobile computing devices, an example of which is illustrated in FIG. 11 in the form of a smartphone. A smartphone 1100 may include a processor 101 coupled to internal memory 1102, a display 1103, and to a speaker. Additionally, the smartphone 1100 may include an antenna 1104 for sending and receiving electromagnetic radiation that may be connected to a wireless data link and/or cellular telephone transceiver 1105 coupled to the processor 1101. Smartphone 1100 typically also include menu selection buttons or rocker switches 1106 for receiving user inputs.

A typical smartphone 1100 also includes a sound encoding/decoding (CODEC) circuit 1112, which digitizes sound received from a microphone into data packets suitable for wireless transmission and decodes received sound data packets to generate analog signals that are provided to the speaker to generate sound. Also, one or more of the processor 1101, wireless transceiver 1105 and CODEC 1112 may include a digital signal processor (DSP) circuit (not shown separately).

Figure 12:
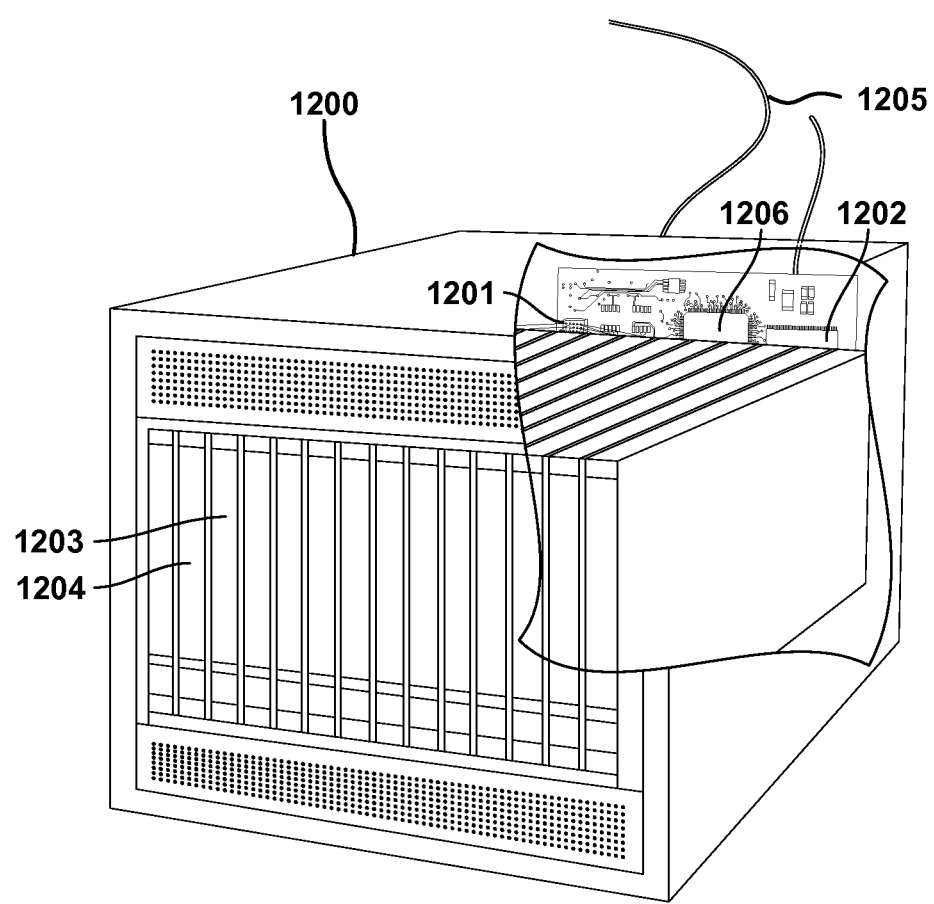
FIG. 12 is an illustration of an example server computer suitable for use with the various aspects.

Portions of the aspect methods may be accomplished in a client-server architecture with some of the processing occurring in a server, such as maintaining databases of action patterns and normal operational behaviors, which may be accessed by a mobile device processor while executing the aspect methods. Such aspects may be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1203. The server 1200 may also include a floppy disc drive, compact disc (CD) or DVD disc drive 1211 coupled to the processor 1201. The server 1200 may also include network access ports 1204 coupled to the processor 1201 for establishing data connections with a network 1205, such as a local area network coupled to other broadcast system computers and servers.

The processors 1101, 1201 may be any programmable microprocessor, microcomputer or multiple processor chip or chips that can be configured by software instructions (applications) to perform a variety of functions, including the functions of the various aspects described below. In some mobile devices, multiple processors 1101 may be provided, such as one processor dedicated to wireless communication functions and one processor dedicated to running other applications. Typically, software applications may be stored in the internal memory 1102, 1202, 1203 before they are accessed and loaded into the processor 1101, 1201. The processor 1101, 1201 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein to refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/ modules discussed here may be implemented in either the kernel space or the user space, unless expressly stated otherwise.

The term "system on chip" (SOC) is used in this application to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used in this application to refer to a single integrated circuit (IC) chip or chip package that contains two or more independent processing cores (e.g., CPU cores) configured to read and execute program instructions. A SOC may include multiple multi-core processors, and each processor in an SOC may be referred to as a core. The term "multiprocessor" is used in this application to refer to a system or device that includes two or more processing units configured to read and execute program instructions.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of analyzing mobile device behaviors to identify a non-benign software application, comprising:
   identifying in a processor of a mobile device a critical data resource in the mobile device that requires close monitoring;
   identifying, via the processor of the mobile device, an intermediate resource in the mobile device that is associated with the critical data resource;
   monitoring, via the processor of the mobile device, activities of both the identified critical data resource and the identified intermediate resource in the mobile device to collect behavior information that identifies a pattern of API calls indicative of non-benign activity by a software application that is operating on the mobile device;
   generating, via the processor of the mobile device, a light-weight behavior signature based on the collected behavior information that identifies the pattern of API calls indicative of non-benign activity by the software application;
   performing behavior-based analysis operations that include:
      using the generated light-weight behavior signature to identify two or more operations of the software application that should be analyzed together as a single mobile device behavior;
      generating a behavior vector based on the identified two or more operations; and
      applying the generated behavior vector to a machine learning classifier model to generate analysis results; and
   using the generated analysis results to determine whether the software application is not benign.

2. The method of claim 1, wherein identifying the critical data resource in the mobile device that requires close monitoring and identifying the intermediate resource in the mobile device that is associated with the critical data resource each further comprises identifying ghost resources.

3. The method of claim 1, wherein identifying the critical data resource in the mobile device that requires close monitoring and identifying the intermediate resource in the mobile device that is associated with the critical data resource each further comprises identifying a resource of the mobile device that requires API call monitoring based on API calls made by the software application to the critical data resource.

4. The method of claim 1, further comprising:
   observing the mobile device behaviors over a period of time to recognize the mobile device behaviors that are inconsistent with normal operation patterns,
   wherein performing the behavior-based analysis operations further comprises dynamically determining the mobile device behaviors that are to be observed to collect information that is to be included in the behavior vector based on information included in the light-weight behavior signature.

5. The method of claim 1, wherein performing the behavior-based analysis operations further comprises:
   identifying the mobile device behaviors that require more detailed analysis based on information included in the light-weight behavior signature.

6. The method of claim 5, further comprising:
   observing the identified mobile device behaviors in greater detail;
   generating a robust behavior signature that more fully describes the observed mobile device behaviors; and
   using the generated behavior signature to perform the more detailed analysis of the observed mobile device behaviors.

7. The method of claim 1, wherein performing the behavior-based analysis operations further comprises:
   determining a time period for which operations of the software application are to be analyzed based on information included in the light-weight behavior signature.

8. A mobile computing device, comprising:
   means for identifying a critical data resource in the mobile computing device that requires close monitoring;
   means for identifying an intermediate resource in the mobile computing device that is associated with the critical data resource;
   means for monitoring activities of both the identified critical data resource in the mobile computing device and the identified intermediate resource in the mobile computing device to collect behavior information that identifies a pattern of API calls indicative of a non-benign activity by a software application that is operating on the mobile computing device;
   means for generating a light-weight behavior signature based on the collected behavior information that identifies the pattern of API calls indicative of non-benign activity by the software application;
   means for performing behavior-based analysis operations that include:
      using the generated light-weight behavior signature to identify two or more operations of the software application that should be analyzed together as a single mobile device behavior;
      generating a behavior vector based on the identified two or more operations; and
      applying the generated behavior vector to a machine learning classifier model to generate analysis results; and
   means for using the generated analysis results to determine whether the software application is not benign.

9. The mobile computing device of claim 8, wherein means for identifying the critical data resource in the mobile computing device that requires close monitoring and the means for identifying intermediate resource in the mobile computing device that is associated with the critical data resource each further comprises means for identifying ghost resources.

10. The mobile computing device of claim 8, wherein means for identifying the critical data resource in the mobile computing device that requires close monitoring and the means for identifying intermediate resource in the mobile computing device that is associated with the critical data resource each further comprises means for identifying a resource of the mobile computing device that requires API call monitoring based on API calls made by the software application to the critical data resource.

11. The mobile computing device of claim 8, further comprising:
   means for observing mobile device behaviors over a period of time to recognize the mobile device behaviors that are inconsistent with normal operation patterns,
   wherein means for wherein performing the behavior-based analysis operations further comprises means for dynamically determining the mobile device behaviors that are to be observed to collect information that is to be included in the behavior vector based on information included in the light-weight behavior signature.

12. The mobile computing device of claim 8, wherein means for performing the behavior-based analysis operations further comprises:
 means for identifying mobile device behaviors that require more detailed analysis based on information included in the light-weight behavior signature.

13. The mobile computing device of claim 12, further comprising:
 means for observing the determined mobile device behaviors in greater detail;
 means for generating a robust behavior signature that more fully describes the observed mobile device behaviors; and
 means for using the generated behavior signature to perform the more detailed analysis of the observed mobile device behaviors.

14. The mobile computing device of claim 8, wherein means for performing the behavior-based analysis operations further comprises:
 means for determining a time period for which operations of the software application are to be analyzed based on information included in the light-weight behavior signature.

15. A mobile computing device, comprising:
 a processor configured with processor-executable instructions to perform operations comprising:
  identifying a critical data resource in the mobile computing device that requires close monitoring;
  identifying an intermediate resource in the mobile computing device that is associated with the critical data resource;
  monitoring both the identified critical data resource in the mobile computing device and the identified intermediate resource in the mobile computing device to collect behavior information that identifies a pattern of API calls indicative of a non-benign activity by a software application that is operating on the mobile computing device;
  generating a light-weight behavior signature based on the collected behavior information that identifies the pattern of API calls indicative of non-benign activity by the software application;
  performing behavior-based analysis operations that include:
   using the generated light-weight behavior signature to identify two or more operations of the software application that should be analyzed together as a single mobile device behavior;
   generating a behavior vector based on the identified two or more operations; and
   applying the generated behavior vector to a machine learning classifier model to generate analysis results; and
  using the generated analysis results to determine whether the software application is not benign.

16. The mobile computing device of claim 15, wherein the processor is configured with processor-executable instructions to perform operations such that identifying the critical data resource in the mobile computing device that requires close monitoring and identifying the intermediate resource in the mobile computing device that is associated with the critical data resource each further comprises identifying ghost resources.

17. The mobile computing device of claim 15, wherein the processor is configured with processor-executable instructions to perform operations such that identifying the critical data resource in the mobile computing device that requires close monitoring and identifying the intermediate resource in the mobile computing device that is associated with the critical data resource each further comprises identifying a resource of the mobile computing device that requires API call monitoring based on API calls made by the software application to the critical data resource.

18. The mobile computing device of claim 15, wherein the processor is configured with processor-executable instructions to perform operations further comprising:
 observing mobile device behaviors over a period of time to recognize the mobile device behaviors that are inconsistent with normal operation patterns,
 wherein performing the behavior-based analysis operations further comprises dynamically determining the mobile device behaviors that are to be observed to collect information that is to be included in the behavior vector based on information included in the light-weight behavior signature.

19. The mobile computing device of claim 15, wherein the processor is configured with processor-executable instructions to perform operations such that performing the behavior-based analysis operations further comprises:
 identifying the mobile device behaviors that require more detailed analysis based on information included in the light-weight behavior signature.

20. The mobile computing device of claim 19, wherein the processor is configured with processor-executable instructions to perform operations further comprising:
 observing the identified mobile device behaviors in greater detail
 generating a robust behavior signature that more fully describes the observed mobile device behaviors; and
 using the generated behavior signature to perform the more detailed analysis of the observed mobile device behaviors.

21. The mobile computing device of claim 15, wherein the processor is configured with processor-executable instructions to perform operations such that performing the behavior-based analysis operations further comprises:
 determining a time period for which operations of the software application are to be analyzed based on information included in the light-weight behavior signature.

22. A non-transitory computer readable storage medium having stored thereon processor-executable software instructions configured to cause a mobile device processor in a mobile computing device to perform operations comprising:
 identifying a critical data resource in the mobile computing device that requires close monitoring;
 identifying an intermediate resource in the mobile computing device that is associated with the critical data resource;
 monitoring both the identified critical data resource and the identified intermediate resource in the mobile computing device to collect behavior information that identifies a pattern of API calls indicative of a non-benign activity by a software application that is operating on the mobile computing device;
 generating a light-weight behavior signature based on the collected behavior information that identifies the pattern of API calls indicative of non-benign activity by the software application;
 performing behavior-based analysis operations that include:
  using the generated light-weight behavior signature to identify two or more operations of the software application that should be analyzed together as a single mobile device behavior;

generating a behavior vector based on the identified two or more operations; and applying the generated behavior vector to a machine learning classifier model to generate analysis results; and using the generated analysis results to determine whether the software application is not benign.

23. The non-transitory computer readable storage medium of claim 22, wherein the stored processor-executable software instructions are configured to cause a mobile device processor to perform operations such that identifying the critical data resource in the mobile computing device that requires close monitoring and identifying the intermediate resource in the mobile computing device that is associated with the critical data resource each further comprises identifying ghost resources.

24. The non-transitory computer readable storage medium of claim 22, wherein the stored processor-executable software instructions are configured to cause a mobile device processor to perform operations such that identifying the critical data resource in the mobile computing device that requires close monitoring and identifying the intermediate resource in the mobile computing device that is associated with the critical data resource each further comprises identifying a resource of the mobile computing device that requires API call monitoring based on API calls made by the software application to the critical data resource.

25. The non-transitory computer readable storage medium of claim 22, wherein the stored processor-executable software instructions are configured to cause a mobile device processor to perform operations further comprising observing mobile device behaviors over a period of time to recognize the mobile device behaviors that are inconsistent with normal operation patterns, and wherein the stored processor-executable software instructions are configured to cause a mobile device processor to perform operations such that performing the behavior-based analysis operations further comprises dynamically determining the mobile device behaviors that are to be observed to collect information that is to be included in the behavior vector based on information included in the light-weight behavior signature.

26. The non-transitory computer readable storage medium of claim 22, wherein the stored processor-executable software instructions are configured to cause a mobile device processor to perform operations such that performing the behavior-based analysis operations further comprises:

identifying the mobile device behaviors that require more detailed analysis based on information included in the light-weight behavior signature.

27. The non-transitory computer readable storage medium of claim 26, wherein the stored processor-executable software instructions are configured to cause a mobile device processor to perform operations further comprising:

observing the identified mobile device behaviors in greater detail generating a robust behavior signature that more fully describes the observed mobile device behaviors; and using the generated behavior signature to perform the more detailed analysis of the observed mobile device behaviors.

28. The non-transitory computer readable storage medium of claim 22, wherein the stored processor-executable software instructions are configured to cause a mobile device processor to perform operations such that performing the behavior-based analysis operations further comprises:

determining a time period for which operations of the software application are to be analyzed based on information included in the light-weight behavior signature.

* * * * *